United States Patent [19]

La Bate

[11] 4,187,335
[45] Feb. 5, 1980

[54] PROCESS FOR TREATING COKE OVEN DOORS AND JAMBS TO PREVENT THE BUILD UP OF TAR THEREON

[76] Inventor: Micheal D. La Bate, 115 Hazen Ave., Ellwood City, Pa. 16117

[21] Appl. No.: 948,886

[22] Filed: Oct. 5, 1978

Related U.S. Application Data

[63] Continuation of Ser. No. 905,513, May 15, 1978.

[51] Int. Cl.² .................................................. B08B 17/02
[52] U.S. Cl. ................................... 427/318; 427/327; 427/427; 201/2; 202/241; 106/38.22; 106/38.28; 65/26; 427/135
[58] Field of Search ............... 201/2, 18, 41; 202/248; 106/2, 307, 38.22, 38.28; 134/39; 264/30; 252/22; 65/26; 427/318, 327, 427, 135

[56] References Cited

U.S. PATENT DOCUMENTS

| 2,246,463 | 6/1941 | Garratt | 427/318 |
| 4,097,304 | 6/1978 | Taylor | 201/2 |
| 4,098,929 | 7/1978 | Badone et al. | 427/318 |

FOREIGN PATENT DOCUMENTS 284218  6/1929  United Kingdom ..................... 428/457

Primary Examiner—Ralph S. Kendall
Attorney, Agent, or Firm—Webster B. Harpman

[57] ABSTRACT

A process of treating a coke oven door and jamb with a material containing micron colloidal particles of graphite in a liquid carrier is described that forms a penetrating and surface coating on the coke oven doors and jambs which acts to prevent leakage of tar and other coke by-products as heretofore common in the art and the resultant inability of maintaining a sealing relation between the door and jamb.

6 Claims, No Drawings

PROCESS FOR TREATING COKE OVEN DOORS AND JAMBS TO PREVENT THE BUILD UP OF TAR THEREON

This is a continuation of application Ser. No. 905,513, filed May 15, 1978.

BACKGROUND OF THE INVENTION

(1) Field of the Invention

This invention relates to coke ovens and the doors thereon and the manner of sealing the doors with respect to the jambs during the coking operation.

(2) Description of the Prior Art

Coke ovens are provided at their opposite ends with self-sealing doors that depend on a metal to metal contact between the door and the continuous machine surfaced cast iron jamb.

In a typical example the sealing edge of the door is carried by a flexible frame and the door assembly includes a powerful spring between the door and the locking bar to force the sealing edge against the metal door jamb to prevent the escape of volatile products from the oven. Such door and jamb assemblies on the coke side and pusher side of the coke ovens commonly fail to maintain a sealing metal to metal relation and tar and other by-products produced during the coking operation escape and build up between the door and the jamb and must be manually removed each time the doors are removed and repositioned when the coke is pushed from the oven. The tar and by-products build up deposits which are difficult to remove and the removal is time consuming so that frequently the doors are repositioned and the desirable sealing relation to effect an efficient coking operation is adversely affected.

The present invention relates to a process of building up a penetrating coating on the sealing edges of the doors and jambs with a material that is not affected by the heat of the coking operation and to which tar and other by-products will not adhere with the result that the sealing edges of the doors and the jambs which are engaged thereby remain clean and free of tar and other by-product build up.

No prior art is known which relates to a material capable of such use or a process of using it.

SUMMARY OF THE INVENTION

A process and material for treating coke oven doors and the like to prevent build up of tar and other coke oven by-products on the doors and jambs comprising the coating of the doors and jambs as by spraying or other application of a material which is essentially micron colloidal particles of graphite in a liquid carrier wherein the extremely fine dispersion of the graphite lowers the surface tension of the carrier and enables the graphite to penetrate the metal surfaces of the coke oven doors and jambs and build up a smooth surface coating. The liquid carrier comprises water, alcohol and one or more liquid soaps which contribute to the penetrating and coating ability of the material. The dictionary description of "micron" is "A colloidal particle whose diameter is between 0.2 and 10 millionths of a meter." The dictionary description of "colloidal" is "Pertaining to or of the nature of a colloid". The dictionary description of "colloid" is "Colloidal particles are about $10^{-7}$ to $5 \times 10^{-5}$ CM. In diameter, larger than most inorganic molecules"; "a gelatinous or other substance which when dissolved in a liquid will not diffuse readily through vegetable or animal membranes."

DESCRIPTION OF THE PREFERRED EMBODIMENT

The material of this invention is particularly suitable for building up penetrating smooth surface coatings on coke oven doors and jambs and comprises substantially 5% to 95% by weight micron colloidal particles of graphite, 5% to 95% by weight water, 5% to 95% alcohol and 1% to 2% liquid soap. Alternately the range of percentages by weight of the ingredients may be 5% to 95% micron colloidal particles of graphite, 5% to 95% of a half and half mixture of water and alcohol and 1% to 2% liquid soap. The alcohol may be any hydrocarbon compound containing an hydrogen atom substituted by the hydroxyl group. A typical alcohol is ethyl alcohol.

The liquid soap may be any of the alkaline salts of palmitic, stearic or oleic acid and preferably contain potassium salts. Additionally the so called resin soaps may be employed and/or a synthetic detergent in an aqueous solution such as sodium lauryl sulfate or triethanolamine laurate or amyl acetate. Those skilled in the art will observe that the various soft soaps or their equivalents as set forth hereinbefore comprise effective wetting agents which contribute to the ability of the micron colloidal particles of graphite penetration of the metal comprising the coke oven doors and jambs. A typical aqueous solution is 50% water and 50% soap solids.

Those skilled in the art will also observe that the percentages of the micron colloidal particles of graphite and their liquid carrier may be widely varied depending upon the number of applications of the material to the metal parts being treated. For example small percentages of the micron colloidal particles of graphite in the liquid carrier perform effectively when a number of applications of the material are applied and when only one or a few applications of the material are applied to the metal surfaces, then the higher percentages of the micron colloidal particles of graphite are more desirable.

In either case the material penetrates the metal surfaces being treated and builds up an extremely smooth slick surface coating to which the tar and by-products from the coke oven will not adhere or if some adherence occurs the adhering material may be easily removed by air or water or other fluid jets.

In using the material disclosed herein the process involves mixing the materials to form a liquid suspension of the micron colloidal particles of graphite and then spraying the same by any suitable spraying equipment on cleaned metal surfaces of the coke oven doors and jambs to be treated. One or more coatings are applied as necessary to build up a smooth unbroken surface of the material on the metal members being treated and the material may be applied to the metal surfaces while they are either hot or cold. The ability of the material to be applied to the hot metal surfaces is particularly advantageous in a coke oven operation as the doors are removed from the ovens to permit a pusher to move the coke from the ovens while the ovens themselves are maintained at or near coking temperatures.

Those skilled in the art will observe that the heretofore necessary manual cleaning of the doors and door jambs frequently requiring motorized buggies and similar mechanical equipment and the time of such cleaning is eliminated through the use of the material and process hereinbefore disclosed.

It will also be observed that the production of metallurgical coke is improved and stabilized by providing for the effective sealing of the coke oven doors made possible by the material and process herein disclosed.

It has been determined that other applications and uses of the material and process are possible and such may include the treating of forging dies in the hot forging of metals and the treatment of various metal handling and processing equipment wherein the surface condition of the metal treating equipment is desirably maintained in a smooth condition resisting adhesion of contaminates thereto. Additionally ingot molds are advantageously treated with the material of the invention and the process of application thereof as such treatment expedites the stripping of ingots from the molds.

The following specific examples of the material have been found satisfactory:

A. 33% micron colloidal particles of graphite by weight, 65% water by weight and 2% liquid soap by weight.
B. 70% micron colloidal particles of graphite by weight, 28% alcohol by weight and 2% liquid soap by weight.
C. 70% micron colloidal particles of graphite by weight, 28% of water by weight, and 2% liquid soap by weight.
D. 51% micron colloidal particles of graphite by weight, 24% water by weight, 23% alcohol by weight and 2% liquid soap by weight.

The treatment of ingot molds hereinbefore referred to by the process and with the material disclosed herein obtains the desired results by reason of the material and the manner of application. Specifically it is known in the art that molten steel in an ingot mold takes carbon from the metal of the ingot mold thereby adversely affecting the interior of the mold by removing portions thereof and it is also known that when this occurs the stripping of the cooled ingot from the mold becomes more difficult because of the interlock obtained between the solidified metal and the irregular surface of the mold. By heating an ingot mold the grain structure enlarges and the porosity of the metal increases.

In the present process the material is preferably applied to the mold when it is heated and the application comprises dipping the heated mold in the liquid suspension material hereinbefore disclosed. Under such conditions the micron colloidal particles of graphite aided by the liquid carrier penetrates the metal surfaces of the ingot mold which have been previously cleaned and build up a smooth coating which being largely graphite is then able to supply the carbon that molten steel absorbs usually from the ingot molt directly. Thus the treating material is sacrificed to some degree and the inner surface of the ingot mold retained in its desirable smooth condition. Stripping ingots from the smooth inner surface of the mold is thus considerably expedited and the molds last considerably longer as the carbon from the metal of the molds is not sacrificed as has heretofore been common in the art.

As used in treating ingot molds or other hot metal handling and shaping devices, the invention is advantageously performed when the metal being treated is clean and hot for the foregoing reasons and it has been determined that under some conditions the liquid carrier can be largely liquid silicone which may be any of the oils, greases, resins and synthetic rubber materials which are made by substituting silicon for carbon in an organic substance. The following specific example of the material having a liquid silicon carrier has been found satisfactory:

E. 70% micron colloidal particles of graphite by weight, 30% liquid silicone by weight.

Although the embodiments of the present invention have been limited as described hereinbefore, it will be apparent to those skilled in the art that various changes and modifications may be made therein without departing from the spirit of the invention and having thus described my invention

What I claim is:

1. A process of treating the engaging portions of steel coke oven doors and jambs that comprises cleaning said portions to the bare metals, applying at least one penetrating coating of a liquid suspension of micron colloidal particles of graphite to said cleaned steel portions so as to build up a smooth convering coating on said steel portions, and drying said coating to form a slick smooth surface.

2. The process of claim 1 and wherein several penetrating coatings of said liquid suspension of micron colloidal particles of graphite are applied to said steel portions successively.

3. The process of claim 1 and wherein several penetrating coatings of said liquid suspension of micron colloidal particles of graphite are sprayed on said steel portions successively.

4. The process of claim 1 and wherein the steel coke oven doors and jambs are heated to a temperature at which the grain structure expands and the porosity of the steel increases prior to applying said penetrating coating.

5. A process of treating the engaging portions of steel coke oven doors and jambs that comprises cleaning said portions to the bare metal, penetrating the surface of said devices with a liquid suspension of micron colloidal particles of graphite, said liquid suspension including at least about.15–75% micron colloidal particles of graphite, applying enough liquid suspension of graphite to said cleaned steel portions to build up an excess of graphite in said surfaces and to form a smooth covering coating on said metal portions, building up sufficient excess of graphite on said surfaces to effectively seal a door to a jamb during operation of an oven, and drying said coating to form a slick smooth surface.

6. A process of treating the engaging portions of steel coke oven doors and jambs that consists essentially of the steps of cleaning said portions to the bare metal, penetrating the surface of said devices with a liquid suspension of micron colloidal particles of graphite, said liquid suspension including at least about 15–75% micron colloidal particles of graphite, applying enough liquid suspension of graphite to said cleaned steel portions to build up an excess of graphite in said surfaces and to form a smooth covering coating on said steel portions, building up sufficient excess of graphite on said surfaces to effectively seal a door to a jamb during operation of an oven, and drying said coating to form a slick smooth surface.

* * * * *